United States Patent
Chase et al.

(10) Patent No.: US 7,346,753 B2
(45) Date of Patent: Mar. 18, 2008

(54) DYNAMIC CIRCULAR WORK-STEALING DEQUE

(75) Inventors: David R. Chase, Belmont, MA (US); Yosef Lev, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/311,201

(22) Filed: Dec. 19, 2005

(65) Prior Publication Data

US 2007/0143326 A1 Jun. 21, 2007

(51) Int. Cl.
- C06F 12/00 (2006.01)
- C06F 13/00 (2006.01)
- C06F 13/28 (2006.01)
- C06F 3/00 (2006.01)
- C06F 5/00 (2006.01)
- C06F 9/46 (2006.01)

(52) U.S. Cl. .................. 711/170; 711/153; 710/56; 718/104

(58) Field of Classification Search .............. 711/153, 711/170; 718/104; 710/56
See application file for complete search history.

(56) References Cited

U.S. PATENT DOCUMENTS

| | | | | |
|---|---|---|---|---|
| 6,145,061 A * | 11/2000 | Garcia et al. | ............... | 711/154 |
| 6,401,147 B1 * | 6/2002 | Sang et al. | ................... | 710/56 |
| 6,560,619 B1 * | 5/2003 | Flood et al. | ................ | 707/206 |
| 6,782,461 B2 * | 8/2004 | Lam | ........................... | 711/170 |
| 6,823,351 B1 * | 11/2004 | Flood et al. | ................ | 707/206 |
| 2001/0056420 A1 * | 12/2001 | Steele et al. | .................... | 707/8 |
| 2003/0005025 A1 * | 1/2003 | Shavit et al. | ............... | 709/102 |
| 2004/0015510 A1 * | 1/2004 | Moir et al. | ................. | 707/101 |
| 2004/0052135 A1 * | 3/2004 | Le | ............................. | 365/202 |
| 2004/0088702 A1 * | 5/2004 | Garthwaite et al. | ......... | 718/100 |

OTHER PUBLICATIONS

"The Performance of Work Stealing in Multiprogramming Environments" Robert D. Blumofe and Dionisios Papadopoulos, Department of Computer Sciences, The University of Texas at Austin, May 28, 1998.*

Arora, et al.; "Thread Scheduling for Multiprogrammed Multiprocessors"; Proceedings of the 10th Annual ACM Symposium on Parallel Algorithms and Architectures (SPAA), Jun. 1998 (11 pages).

* cited by examiner

*Primary Examiner*—Matthew Kim
*Assistant Examiner*—Michael Alsip
(74) *Attorney, Agent, or Firm*—Osha Liang LLP

(57) ABSTRACT

A deque of a local process in a memory work-stealing implementation may use one or more data structures to perform work. If the local process attempts to add a new value to its deque's circular array when the data structure is full (i.e., an overflow condition occurs), the contents of the data structure are copied to a larger allocated circular array (e.g., a circular array of greater size than the original circular array). The entries in the original, smaller-sized circular array are copied to positions in the now-active, larger-sized circular array, and the system is configured to work with the newly activated circular array. By this technique, the local process is thus provided with space to add the new value.

14 Claims, 5 Drawing Sheets

DYNAMIC CIRCULAR WORK-STEALING DEQUE

STATEMENT REGARDING FEDERALLY SPONSORED RESEARCH OR DEVELOPMENT

The present invention was made with the support of the government of the United States under contract NBCH020055 awarded by the Defense Advanced Research Projects Administration. The United States government may have certain rights in the present invention.

BACKGROUND

A modern computer system has at least a microprocessor and some form of memory. Generally, the processor processes retrieves data stored in the memory, processes/uses the retrieved data to obtain a result, and stores the result in the memory.

One type of computer system uses a single processor to perform the operations of the computer system. In such a single processor (or "uniprocessor") computer system, incoming memory requests to memory occur serially. However, as described below with reference to FIG. 1, in a computer system that uses multiple processors at least partly in order to increase data throughput, due to parallel processing (i.e., simultaneous processing by two or more processors), memory shared by multiple processors may receive multiple memory requests that overlap in both time and space.

FIG. 1 shows a typical multiprocessor system 100. In FIG. 1, multiple processors 102, 104 share a memory 106 formed of numerous individual memory locations. An important design consideration in shared memory multiprocessor systems involves balancing work loads among processors. When a particular processor finds that it lacks the resources to perform a particular thread of work, the processor may obtain necessary resources from a processor that has such resources available. Such a technique is known and referred to as a "work-stealing" technique.

In a typical work-stealing technique such as, for example, that described in "Thread Scheduling for Multiprogrammed Multiprocessors" by N. Arora et al., each process maintains its own pool of ready threads from which the process obtains work resources. If the pool of a particular process becomes empty (due to, for example, heavy work demand on the process), that process becomes a "thief" and steals a thread from the pool of a "victim" process chosen at random as discussed below with reference to FIG. 2.

As shown in FIG. 2, a pool of threads 201 for a process is maintained with a fixed-size double-ended memory queue (or deque 203), which has a top index that indexes the top thread and a variable bottom index that indexes the deque location below the bottom thread. Further, the deque has an array pointer that points to an active array of the deque. In general, the typical work-stealing technique involves a collection of deque data structures as shown in FIG. 2, where a local process performs pushes and pops on the "bottom" end of its deque and a thief process perform a pop on the "top" end of a victim process's deque. A pop operation is also referred to as a "removal-type operation."

Further, those skilled in the art will recognize that for n processes and a total allocated memory size m, each deque may have up to a memory size of m/n. Accordingly, designers often have to implement costly mechanisms to manage deque overflow.

To obtain work, i.e., to obtain a thread, a process pops a ready thread from the bottom of its deque and commences executing that thread. The process continues to execute that thread until the thread either blocks or terminates, at which point the process returns to its deque to obtain another ready thread. During the course of executing a thread, if a new thread is created or a blocked thread is unblocked, the process pushes that thread onto the bottom of its deque. Alternatively, the process may preempt the thread it was executing, push that thread onto the bottom of its deque, and commence executing the newly available ready thread. Those skilled in the art will recognize that as long as the deque of a process is non-empty, the process manipulates its deque in a last-in-first-out (LIFO) manner.

If a process finds that its deque is empty when the process attempts to obtain work by popping a thread off the bottom of its deque, the process becomes a thief. In this case, the thief process picks a victim at random and attempts to "steal" work, i.e., obtain a thread, by removing the thread at the top of the deque belonging to the victim process. If the deque of the victim process is empty, the thief process picks another victim process and tries to steal work again. The thief process repeatedly attempts to steal work until the thief process finds a victim process that has a deque that is non-empty, at which point, the thief process "reforms" (i.e., ceases to be a thief) and commences work on the stolen thread as discussed above. Those skilled in the art will recognize that because work-stealing takes place at the top of a victim process's deque, work-stealing operates in a first-in-first-out (FIFO) manner.

When a thief process and a victim process concurrently attempt to obtain the same thread from the victim process's deque, a synchronization operation must be invoked to ensure proper operation. This scenario is detected by examining the gap between the top and bottom indexes. If the indexes are "too close," a synchronization operation using known non-blocking primitives such as Compare&Swap or Load-Linked/Store-Conditional may be invoked.

Due to the fixed-size memory space dedicated to each process in a typical work-stealing technique, applications that use the work-stealing technique (e.g., garbage collection) implement specific blocking mechanisms to handle overflow situations. One approach used to lessen the frequency of overflow handling involves resetting top and bottom to index the beginning of the deque every time an empty deque condition is detected. However, although such a reset operation may lessen the amount of times overflow occurs, costly mechanisms to manage overflow are still needed for those times that overflow still occurs.

SUMMARY

According to one aspect of one or more embodiments of the present invention, a computer system comprises: a plurality of integrated circuits capable of concurrently executing a first process and a second process; and memory having a deque local to the first process, the deque comprising a first data structure implemented as a first circular array, where (i) if an operation to add a value to the first data structure results in an overflow condition, the computer system is configured to allocate and activate a second data structure for the deque to which the contents of the first data structure are copied and the value is added, (ii) the second data structure is implemented as a second circular array that has more entries than the first circular array, and (iii) the computer system is further configured to allow any one of the first process and the second process to obtain a value from an active one of the first data structure and the second data structure.

According to another aspect of one or more embodiments of the present invention, a method of performing computer system operations comprises: implementing in memory a deque local to a first process, where the deque has a first data structure implemented as a first circular array for storing data; invoking an operation to add a value to the first data structure; and if the invoking causes an overflow condition, (i) allocating a second data structure for the deque, where the second data structure is implemented as a second circular array that is larger than the first circular array, (ii) copying contents of the first data structure to the second data structure, (iii) activating the second data structure for use by the first process, and (iv) adding the value to the second data structure, where any one of the first process and the second process is allowed to invoke an operation to obtain a value from an active one of the first data structure and the second data structure.

According to another aspect of one or more embodiments of the present invention, a computer system comprises: a deque associated with a first process in a shared memory multiprocessor system, the deque comprising a first data structure implemented as a first circular array; and instructions stored in memory to, if an operation invoked by the first process to add a value to one end of the first data structure results in an overflow condition, (i) allocate a second data structure for the deque, where the second data structure is implemented as a second circular array that is larger than the first circular array, (ii) copy contents of the first data structure to the second data structure, (iii) activate the second data structure for use by the first process, and (iv) add the value to the second data structure, where any one of the first process and the second process is allowed to obtain a value from an active one of the first data structure and the second data structure.

In accordance with another aspect of one or more embodiments of the present invention, a computer system comprises: a plurality of integrated circuits; a memory accessible to the plurality of integrated circuits; and instructions in the memory to (i) implement in memory a deque local to a first process, the deque having a first data structure implemented as a first circular array, (ii) invoke an operation to add a value to the first data structure, (iii) if the operation causes an overflow condition, allocate a second data structure for the deque, where the second data structure is implemented as a second circular array that is larger than the first circular array, (iv) copy the contents of the first data structure to the second data structure, (v) activate the second data structure for use by the first process, and (vi) add the value to the second data structure, where any one of the first process and the second process is allowed to invoke an operation to obtain a value from an active one of the first data structure and the second data structure.

Other aspects and advantages of the invention will be apparent from the following description and the appended claims.

DETAILED DESCRIPTION

As described above, in a memory work-stealing implementation, a local process maintains its deque to which the local process has access via one end of the deque (e.g., the bottom of the deque). When another process (in this case, the "thief" process) attempts to "steal" resources from the local process (in this case, the "victim" process), the thief process accesses the victim process's deque via another end of the deque (e.g., the top of the deque). Thus, operations by the local process to add or remove entries to its deque may be referred to as PushBottom and PopBottom operations, respectively, and an operation by another process to remove an entry from the local process's deque may be referred to as a PopTop operation.

Figure 1:
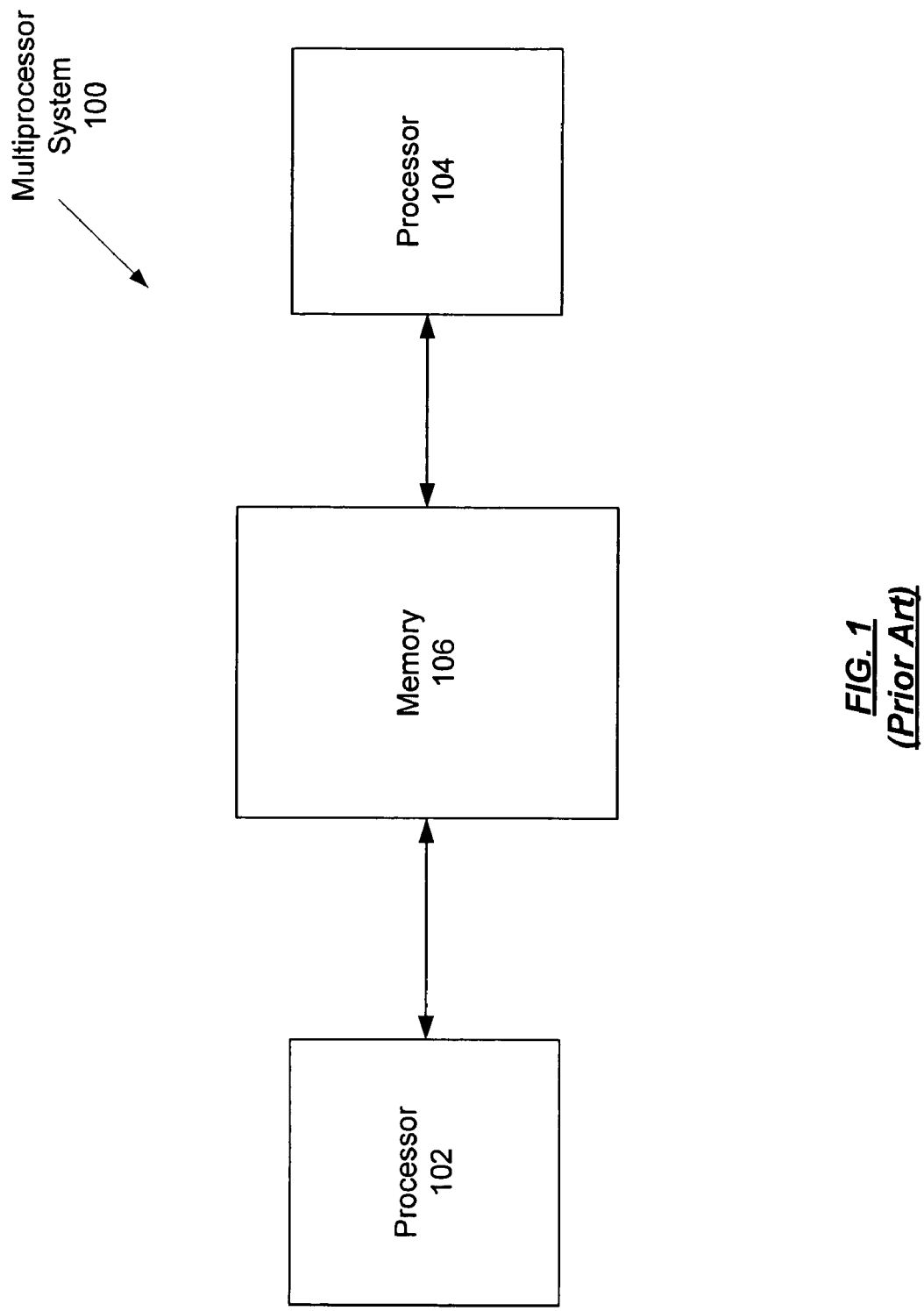
FIG. 1 shows a portion of a typical shared memory multiprocessor system.
Figure 2:
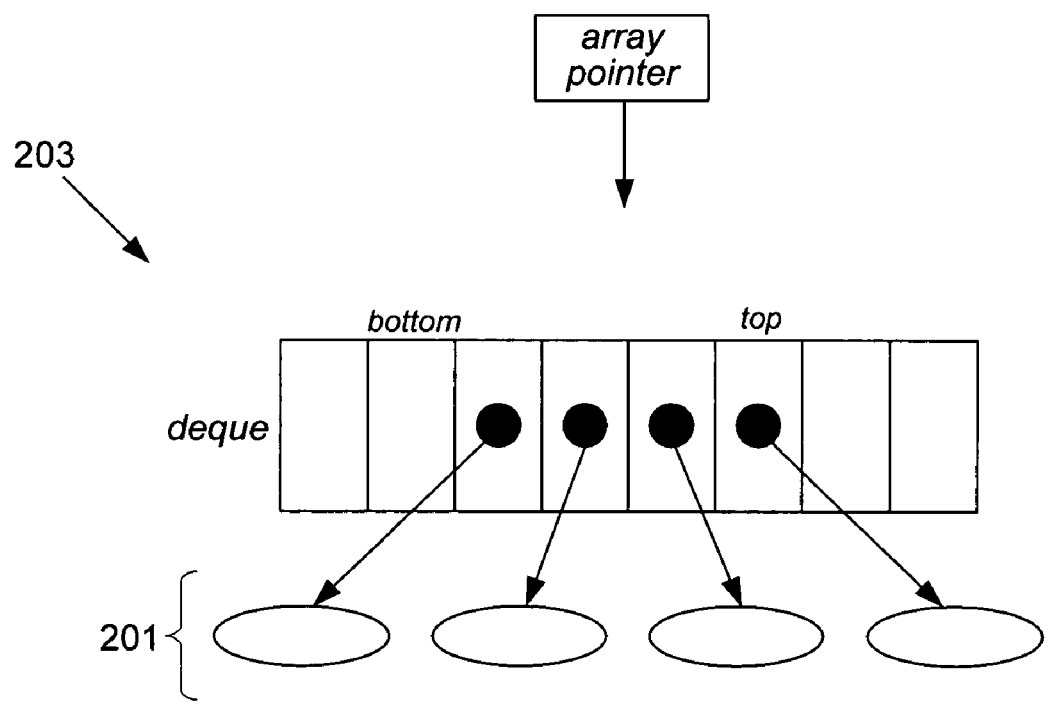
FIG. 2 shows a typical implementation of a deque.
Figure 3:
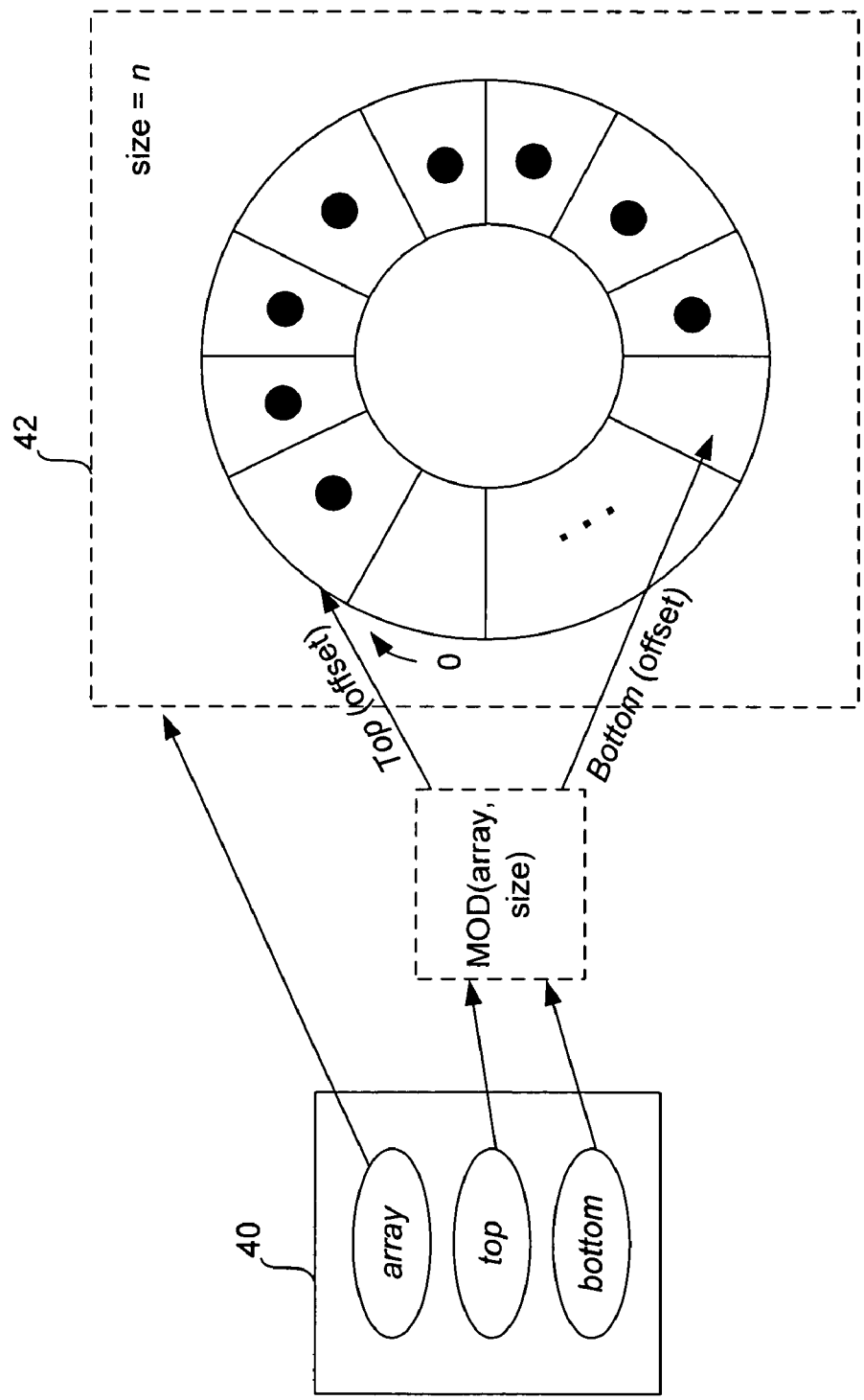
FIG. 3 shows a deque in accordance with an embodiment of the present invention.

Embodiments of the present invention relate to a memory work-stealing technique. As shown in FIG. 3, in one or more embodiments of the present invention, the deque 40 of a local process in a memory work-stealing implementation may be implemented with a cyclic array 42. The deque 40 is implemented together with two indices: top and bottom, indicating the ends of the deque 40. Specifically, bottom indicates the next slot in the cyclic array 42 where the next new element is pushed. Further, bottom is incremented on every PushBottom operation. Top indicates the topmost element in the deque (if there is any) and is incremented on every steal operation (further described below). Those skilled in the art will note if bottom is less than or equal to top, the deque 40 is empty.

In general, regular read/write operations may occur at the bottom of the circular array 42 using PushBottom and PopBottom operations. At the top of the circular array 42, an element may be read using a PopTop operation.

The steal and PopBottom operations are similar to that used in the memory work-stealing algorithm described in "Thread Scheduling for Multiprogrammed Multiprocessors" by N. Arora et al. One difference, however, is that in one or more embodiments of the present invention, top does not have a tag; instead, top may not be decrementable. Further, in one or more embodiments of the present invention, the deque 40 may have a private algorithm that receives two values for top (old and new) and atomically modifies top to the new value if top has the old value. Those skilled in the art will note that such an algorithm may be implemented using a Compare&Swap operation.

PushBottom Operations

A PushBottom operation, in accordance with one or more embodiments of the present invention, inserts a pushed entry to the deque 40 by writing the entry in the location specified by bottom. Then, bottom is incremented by 1. Further, the PushBottom operation may also be responsible for enlarging the cyclic array 42 (further described below with reference to FIG. 4) if an element is pushed into an already-full array.

To check whether the circular array 42 is full, the PushBottom operation subtracts the value of top from bottom (which gives the number of elements that were in the deque 40 when top was read) and compares the result to the size of the circular array 42. Those skilled in the art will note that in one or more embodiments of the present invention, the size of a particular circular array may be written inside a field of the associated circular array object. Further, in one or more embodiments of the present invention, at least one element of the circular array 42 may be left unused for memory reclamation purposes.

Further, in one or more embodiments of the present invention, top may be read on every execution of a PushBottom operation. Further still, in one or more embodiments of the present invention, the frequency of accesses to top may be reduced by keeping a local upper bound on the size of the deque and only reading top when the local upper bound indicates that an array expansion may be necessary. Such a local upper bound may be easily implemented by saving a last value of top read in a local variable and using this variable to compute the size of the deque (instead of a real value of top). Because top may not be decremented, those skilled in the art will note that real size of the deque may only be smaller than one calculated using the variable.

Growing a Circular Array

Figure 4:
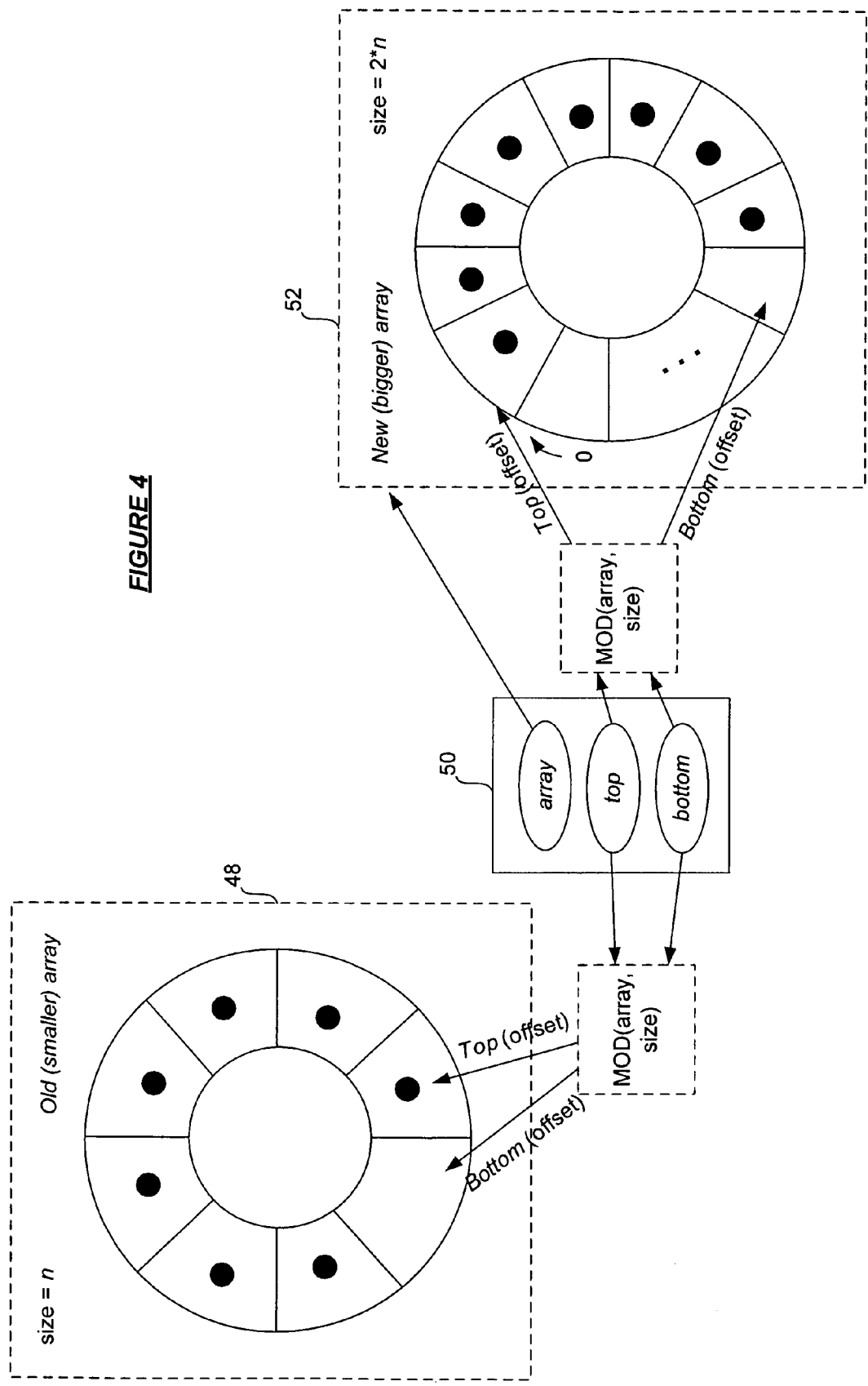
FIG. 4 shows a deque in accordance with an embodiment of the present invention.

Now referring to FIG. 4, when circular array 48 is full, a new doubled size circular array 52 is allocated, and the elements in the old circular array 48 are copied to the new circular array 52. Those skilled in the art will note that because the elements are indexed modulo the array size, the actual array indexes where the elements are stored might change when copying from the old circular array 48 to the new circular array 52; however, the values of top and bottom remain the same.

Further, those skilled in the art will note that although FIG. 4 shows a growth algorithm where a circular array size is doubled, in one or more other embodiments of the present invention, a growth algorithm may be scaled differently.

In one or more embodiments of the present invention, it may be possible to predict that an overflow condition will occur. If an overflow condition is predicted, the contents of an active smaller-sized circular array may be copied using a background process. In one or more other embodiments of the present invention, when a PushBottom operation detects than an array is x % full, it may invoke a background process to start copying the contents of a currently active smaller-sized circular array to a potentially active bigger-sized circular array. When the background process completes, an indication may be given that the copying is complete. In such embodiments, a local process may keep track of a minBottom variable after the background process began and until an overflow occurs so that when the overflow occurs, the local process may copy only those entries positioned after minBottom.

Steal Operations

A steal operation, in accordance with one or more embodiments of the present invention, begins by reading top and bottom and checking whether a deque (e.g., 50 in FIG. 4) is empty by comparing top and bottom. If the deque is not empty, the steal operation reads the element stored in the top position of a cyclic array (e.g., 52 in FIG. 4) and attempts to increment top using an atomic operation (e.g., a Compare&Swap operation). If the atomic operation fails, this indicates that a concurrent pop operation (e.g., a PopTop (steal operation, a PopBottom operation) successfully removed an element from the deque; otherwise, the atomic operation returns the element read right before the successful atomic operation. Due to the use of the cyclic array, it may be important to read the element from the cyclic array prior to the atomic operation because after the atomic operation completes, this location may be refilled with a new value by a concurrent PushBottom operation.

A successful atomic operation indicates a point at which the steal operation takes place. Because top is read before bottom, those skilled in the art will note that if the atomic operation succeeds, the read values represent a consistent view of the deque memory. In other words, and more specifically, a successful atomic operation implies that top and bottom operation had their observed values when bottom was read.

PopBottom Operations

A PopBottom operation, in accordance with one or more embodiments of the present invention, may be performed using regular read/write operations (i.e., without using an atomic synchronization operation). If the deque was already empty, then the PopBottom operation resets bottom to a canonical empty state (i.e., bottom=top) and returns an EMPTY value. If the deque becomes empty, then the owning process may perform an atomic operation (e.g., a Compare&Swap operation) on top to determine whether a concurrent steal operation successfully popped the last item. In one or more embodiments of the present invention, the atomic operation is performed on top and not on a tag (those skilled in the art will note that incrementing top when the deque is empty leaves the deque in an empty state). After the atomic operation, regardless of whether it succeeds, the value of top is t+1 (those skilled in the art will note that if the atomic operation fails, then a concurrent steal operation may have updated top to t+1). Therefore, the deque is empty, and the operation completes by storing t+1 in bottom.

Shrinking a Circular Array After Growth

In one or more embodiments of the present invention, shrinking a circular array (e.g., 52 in FIG. 4) may involve checking against a minimum use fraction of the circular array (e.g., less than ½ when using a doubling algorithm for circular array growth operations) when performing a PopBottom operation. Further, in one or more embodiments of the present invention, a shrink operation may be independent of a PopBottom operation, and therefore, the shrink operation may be invoked by a local owning process on other occasions (e.g., after a PushBottom operation).

In one or more embodiments of the present invention, a shrink operation may involve allocating a new smaller circular array and copying the data from a bigger circular array to the new smaller circular array. Allocation time may be reduced by retaining a reference from the bigger circular array to the smaller circular array when previously growing from the smaller circular arrays to the bigger circular array. If a bigger circular array stores a reference to the smaller circular array from which it grew, a garbage collector algorithm may not be able to deallocate all the smaller circular array preceding the currently active circular array.

Further, those skilled in the art will note that by retaining references to a smaller circular array as described above, some copying may also be reduced: when a bigger circular array shrinks backs to its previous smaller circular array, only elements that were modified while the bigger circular array was active need to be copied (because the smaller circular array was not deallocated and therefore not modified while the bigger circular array was active). This may be achieved by maintaining a min variable with each circular array, where min is an integer that indicates the lowest value of bottom in which an element was stored while the bigger circular array was active. When a deque (e.g., 50 in FIG. 5) shrinks its circular array, only the elements stored in indexes greater than or equal to min of the bigger circular array may be copied. Further, in one or more embodiments of the present invention, the min value of the smaller circular array may be updated to the minimum of the bigger circular array's and the smaller circular array's min values.

Using a Shared Pool of Buffers

In one or more embodiments of the present invention, one or more of the various deque algorithms described above may depend on a garbage collector to reclaim unused memory. However, in one or more other embodiments of the present invention, instead of using a garbage collector, a pool of buffers may be designated for memory work-stealing and not be subject to garbage collection. In such embodiments, extra available buffers for all or a set of deques may be kept in a shared pool of buffers. When an owning process needs a bigger circular array for its deque, the process may allocate one from the shared pool of buffers. Further, when an owning process shrinks its deque to a smaller circular array, the process may return the bigger circular array to the shared pool of buffers. This may be achieved by guaranteeing that any concurrent PopTop (steal) operation that is pending on the bigger circular array will fail, thereby not returning a value from this reclaimed array.

Those skilled in the art will note that use of a shared pool of buffers as described above may be more efficient and/or less expensive than performing memory reclamation with a garbage collector. Further, those skilled in the art will note that use of a shared pool of buffers may allow an owning process to reclaim a buffer while there may be still other processes referencing the buffers, thereby leading to a more efficient use of the space allocated with the shared pool of buffers.

In one or more other embodiments of the present invention, a deque may be formed of structures other than a single circular array. For example, in one embodiment of the present invention, a deque may be formed of a dynamically-linked circular array.

Figure 5:
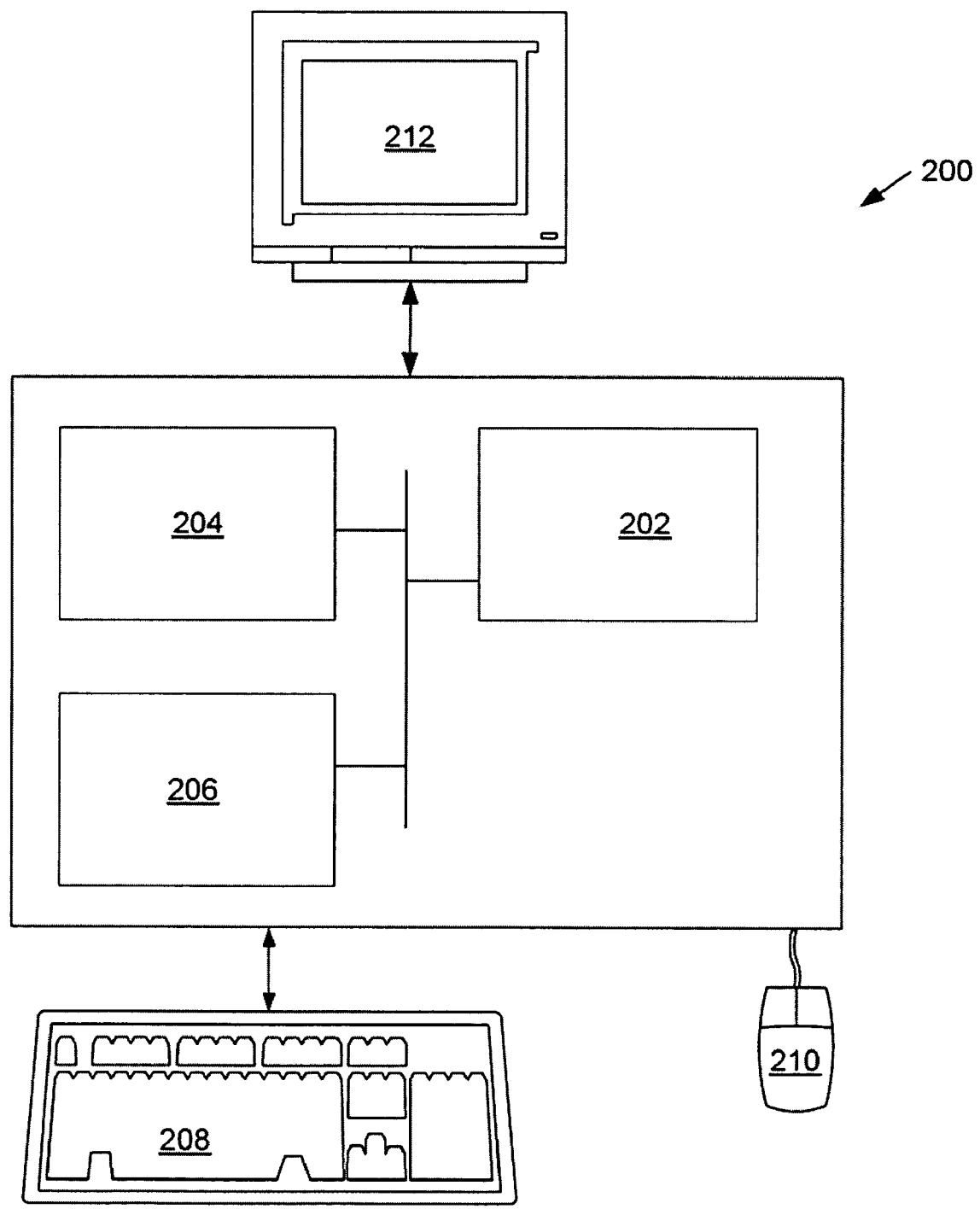
FIG. 5 shows a computer system in accordance with an embodiment of the present invention.

Further, one or more embodiments of the present invention may be associated with virtually any type of computer system, including multiprocessor and multithreaded uniprocessor systems, regardless of the platform being used. For example, as shown in FIG. 5, a networked computer system 200 includes at least one processor 202, associated memory 204, a storage device 206, and numerous other elements (not shown) and functionalities typical of modern computer systems. The networked computer system 200 may also include input means, such as a keyboard 208 and a mouse 210, and output means, such as a monitor 212. The networked computer system 200 is connected to a local area network (LAN) or a wide area network (e.g., the Internet) via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform one or more embodiments of the present invention may be stored on a computer readable medium such as a compact disc (CD), a diskette, a tape, a file, a hard drive, or any other computer-readable storage device.

Advantages of the present invention may include one or more of the following. In one or more embodiments of the present invention, a memory work-stealing technique uses one or more simple deque techniques, in which a new, bigger-sized circular array may be used if an overflow condition occurs.

In one or more embodiments of the present invention, in a memory work-stealing technique, because a process may dynamically switch between using a bigger-sized circular array and a smaller-sized circular array, overflow conditions may be efficiently handled.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of executing threads comprising:
   obtaining a first circular array local to a first process, wherein the first circular array is associated with a first minimum bottom value and stores a plurality of thread references;
   invoking a first push operation to add a first thread reference to the first circular array, wherein the first push operation triggers an overflow condition associated with the first circular array;
   allocating a second circular array exceeding a size of the first circular array, wherein the second circular array is associated with a shrink operation and a second minimum bottom value;
   copying the plurality of thread references from the first circular array to the second circular array;
   adding the first thread reference to the second circular array;
   invoking a first pop operation to remove a second thread reference from the second circular array;
   invoking the shrink operation after invoking the first pop operation to activate the first circular array, wherein invoking the shrink operation comprises copying a third thread reference with an index value exceeding the second minimum bottom value from the second circular array to the first circular array; and
   executing a thread referenced by the second thread reference.

2. The method of claim 1, wherein invoking the shrink operation further comprises:
   switching an array pointer from referencing the second circular array to referencing the first circular array.

3. The method of claim 1, wherein a copy of a fourth thread reference stored in the second circular array having an index value less than the second minimum bottom value is stored in the first circular array prior to copying the third thread reference.

4. The method of claim 1, further comprising:
   invoking a second push operation associated with the first circular array after invoking the shrink operation, wherein the second push operation triggers the overflow condition;
   copying a fourth thread reference with an index value exceeding the first minimum bottom value from the first circular array to the second circular array; and
   activating the second circular array.

5. The method of claim 4, wherein a copy of a fifth thread reference stored in the first circular array having an index value less than the first minimum bottom value is stored in the second circular array prior to copying the fourth thread reference.

6. The method of claim 1, wherein the first circular array, the second circular array, and the array pointer are associated with a deque local to the first process.

7. The method of claim 1, wherein the first circular array and the second circular array are associated with a shared plurality of buffers.

8. The method of claim 1, further comprising:
   invoking a second pop operation on a top of at least one circular array selected from a group consisting of the first circular array and the second circular array, wherein the second pop operation is invoked by a second process.

9. The method of claim 1, wherein the first push operation is performed on a bottom of the first circular array.

10. The method of claim 1, wherein the first pop operation is performed on a bottom of the second circular array.

11. An apparatus for executing threads comprising:
means for obtaining a first circular array local to a first process, wherein the first circular array stores a plurality of thread references and wherein the first circular array is associated with a first minimum bottom value;
means for invoking a first push operation to add a first thread reference to the first circular array, wherein the first push operation triggers an overflow condition associated with the first circular array;
means for allocating a second circular array exceeding a size of the first circular array, wherein the second circular array is associated with a shrink operation and a second minimum bottom value;
means for copying the plurality of thread references from the first circular array to the second circular array;
means for adding the first thread reference to the second circular array;
means for invoking a first pop operation to remove a second thread reference from the second circular array;
means for invoking the shrink operation after invoking the first pop operation to activate the first circular array, wherein invoking the shrink operation comprises copying a third thread reference with an index value exceeding the second minimum bottom value from the second circular array to the first circular array; and
means for executing a thread referenced by the second thread reference.

12. The apparatus of claim 11, wherein a copy of a fourth thread reference stored in the second circular array having an index value less than the second minimum bottom value is stored in the first circular array prior to copying the third thread reference.

13. The apparatus of claim 11, further comprising:
means for invoking a second push operation associated with the first circular array after activating the first circular array, wherein the second push operation triggers the overflow condition;
means for copying a fourth thread reference with an index value exceeding the first minimum bottom value from the first circular array to the second circular array; and
means for activating the second circular array.

14. The method of claim 13, wherein a copy of a fifth thread reference stored in the first circular array having an index value less than the first minimum bottom value is stored in the second circular array prior to copying the fourth thread reference.

* * * * *